Dec. 13, 1932.                    E. BRUCE                    1,890,454
                          AUTOMATIC GAIN CONTROL
                            Filed Dec. 21, 1928
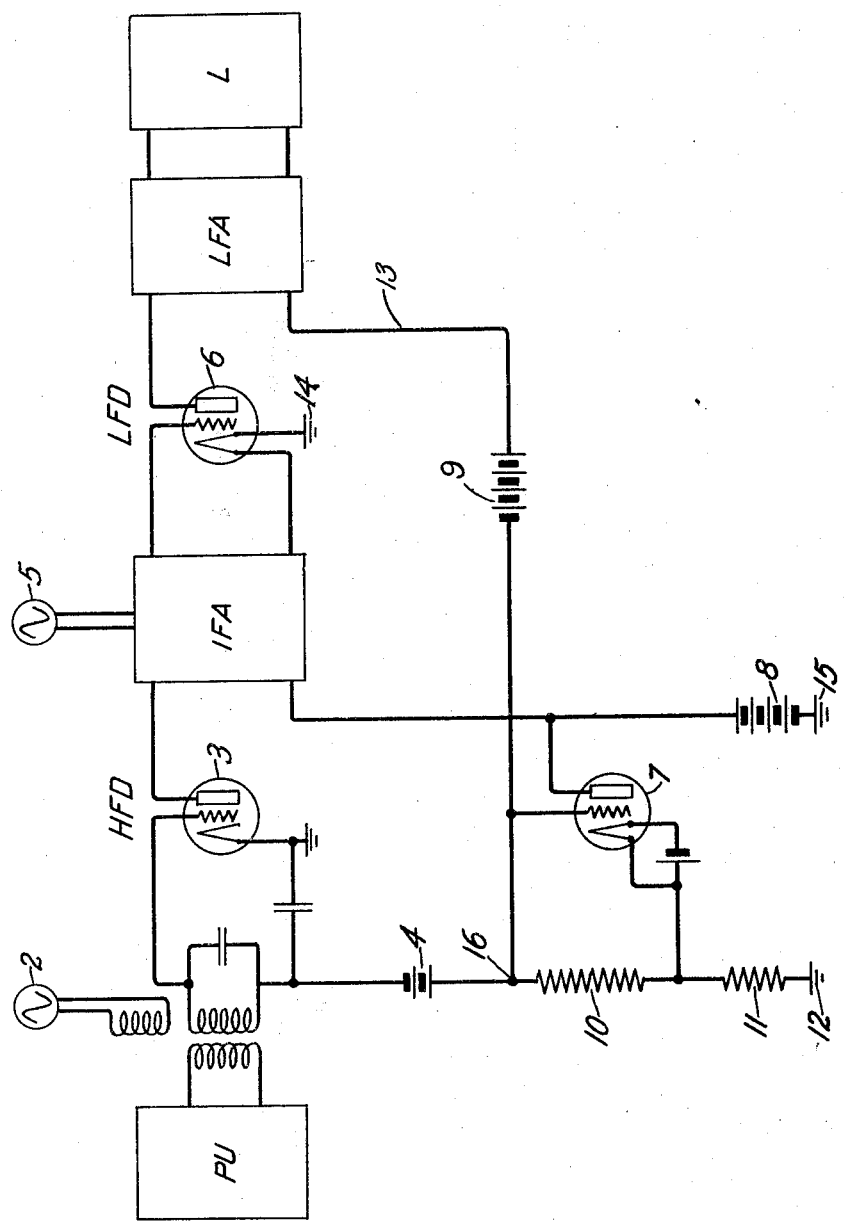
INVENTOR
E. BRUCE
BY   J.P. Neville
                ATTORNEY Patented Dec. 13, 1932

1,890,454

UNITED STATES PATENT OFFICE

EDMOND BRUCE, OF RED BANK, NEW JERSEY, ASSIGNOR TO BELL TELEPHONE LABORATORIES, INCORPORATED, OF NEW YORK, N. Y., A CORPORATION OF NEW YORK

AUTOMATIC GAIN CONTROL

Application filed December 21, 1928. Serial No. 327,564.

This invention relates to a gain control for systems including space discharge devices and more especially to a method of and means for maintaining approximately constant the output level of the system, even though the input energy varies over a wide range of values.

Numerous suggestions have been made for maintaining at a constant level the output energy of space discharge systems supplied with input energy which varies from time to time.

One such system, for example, is disclosed in Affel Patent 1,511,015. In this system the unmodulated component carrier wave is selected and rectified, the rectified current is passed through a resistance, and the resultant IR drop is utilized to vary the biasing potential applied to the grid of the detector tube.

Another system is disclosed in British Patent 287,972 of June 21, 1928 in which a biasing potential is obtained from the IR drop through a resistance inserted in the plate current circuit of the low frequency detector.

It has been found that the system of the present invention affords an extremely sensitive control which operates to maintain the output level constant to a high degree even though the input energy level varies between wide limits.

It is an object of this invention to maintain a constant level output from a space discharge system when the input level varies between wide limits.

A further object, which is incidental to the first object, is to vary a direct current flow between wide limits by a direct current which varies between comparatively small limits.

In the embodiment of the invention which will be described hereinafter, a space discharge device and two resistance elements are associated with the second or low frequency detector of a double detection system. The space current of the detector flows through both of the resistances while that of an auxiliary space discharge device flows through but one of the resistances and in the opposite direction to the space current of the detector, thereby setting up opposing IR drops in that resistance element. The potential drop across the other resistance element, carrying only the space current of the detector, is applied between the grid and cathode of the auxiliary device. The potential drop across both resistances is applied between the grid and cathode of the high frequency or control detector.

When the output current of the low frequency detector changes, the IR drop across the two resistances changes correspondingly. this change in the potential drop across the resistance carrying only the space current of the detector changes the biasing potential applied to the grid of the auxiliary device, whereby its space current and hence the IR drop due to it changes, causing an augmented change in the potential which is applied to the grid of the control detector.

In the circuit arrangement to be described the space discharge device in which this circuit is exercised is the first or high frequency detector. However, it is to be understood that the invention is not so limited and hence the control may be effected by applying the variable biasing potential to the grid of any space discharge device included in the system.

The invention will be better understood from the following description in connection with the accompanying drawing, the single figure of which shows schematically a preferred form, the invention however is to be limited only by the scope of the appended claims.

In the drawing the source of energy carrying the signals which it is desired to receive is represented generally by block PU. This source may be a radio antenna system or the terminal apparatus of a line wire carrier system etc.

The incoming energy is combined with locally generated oscillations from any convenient source 2 by means of space discharge device 3. The grid or control electrode of device 3 has applied to it a biasing potential from source 4 of such a value that with normal strength of incoming energy, the output of the receiver will have a desired level.

The desired intermediate frequency is selected and amplified in the usual manner by means of apparatus which is well known and which is indicated in the drawing by block IFA.

Oscillations from a second local source 5 are combined with the intermediate frequency wave in space discharge device 6 to produce an audible signal. The audio frequency current resulting from the second detection in device 6 may be amplified in a low frequency amplifier LFA and then further transmitted or directly changed into sound energy as may be desired in well known apparatus represented by block L.

An auxiliary space discharge device 7 is associated with the second detector 6 in a manner to be described hereinafter.

Space current for the auxiliary device 7 and for the high frequency detector 3 is obtained from a source 8, while space current for the low frequency detector 6 is obtained from source 9. Sources 8 and 9 are represented as batteries, but they may be any independent sources of direct current energy.

Source 8 is directly grounded at its negative pole while source 9 is grounded on the negative side through resistances 10 and 11.

The space current path for low frequency detector 6 may be traced from ground 12 through resistances 11 and 10, source of direct current 9, conductor 13, plate and filament of low frequency detector 6 to ground at 14.

The space current path for auxiliary device 7 may be traced from ground 15, direct current source 8, plate and filament of device 7, resistance 11 to ground at 12. It will be noted that space current for device 7 flows through resistance 11 in an opposite direction to that of space current of device 6.

The values of resistances 10 and 11 in one installation were 48,000 ohms and 22,000 ohms respectively, with direct current sources 8 and 9 of 135 volts each and grid biasing source 4 of 22½ volts.

The operation of a double detection receiver is well understood and for that reason the operation of the apparatus described above will be limited to that portion of the apparatus with which the present invention is specifically concerned.

As mentioned above the grid biasing potential of high frequency detector 3 is such that a normal strength incoming signal will produce a signal of the desired level in the output of the receiver. This potential is derived from source 4, and the flow of space current for devices 6 and 7 through resistances 10 and 11. That is, under normal conditions of operation, the IR drop through resistances 10 and 11 due to the space current of device 6, the opposed IR drop through resistance 11 due to the space current of device 11, together with source 4 determines the grid biasing potential for high frequency detector 3 while the grid bias for auxiliary device 7 is determined by the space currents and resistances 10 and 11 as will be readily understood.

Assume now that the incoming signal has a value larger than normal. This will cause an increased flow of space current through low frequency detector 6. This increased flow of current through resistances 10 and 11 causes an increased IR drop through both thereby making the potential of the point 16 with respect to ground 12 more negative than under normal conditions. This change of potential difference between the terminals of resistance 10 is effective on the grid of auxiliary device 7 to reduce the flow of space current therethrough and hence the IR drop through resistance 11, due to this space current, is reduced.

It will be recalled that the space current of device 7 flows through resistance 11 in an opposite direction to the space current of device 6. The decrease in space current of device 7 therefore causes a reduction in the opposed IR drop in resistance 11. This causes the potential of point 16 with respect to ground 12 to become still more negative. In other words, the potential of the point 16 with respect to ground 12 is made more negative due not only to the increase of plate current of the device 6 flowing through resistances 10 and 11 but also to the decrease in the opposed IR drop produced by the flow of decreased plate current of tube 7 through the resistance 11.

This potential of point 16 is added to the constant voltage of source 4 and impressed upon the grid of the low frequency detector 3, as will readily appear from the drawing. The increase of negative potential of the point 16, therefore, causes the grid of device 3 to become more negative which in turn reduces the overall gain of the receiver bringing its output back to the desired level.

In case the energy level of the incoming signal falls below the normal value it will be apparent that the space currents of the low frequency detector 6 and auxiliary device 7 will change causing the potential drop across resistances 10 and 11 to fall. This decrease in the potential drop across resistance 10 increases the plate current of the auxiliary device 7. The resulting decrease in the potential difference between the point 16 and ground 12 due both to the decrease in space current of the device 6 and the consequent increase in the space current of device 7 causes a decrease in the grid biasing potential applied to the device 3 and a consequent increase in the overall amplification of the receiver.

No attempt has been made to illustrate or describe a double detection receiver completely as this is not believed essential to a complete understanding of the invention which is recited in the appended claims.

What is claimed is:

1. In combination, a space discharge device, an auxiliary space discharge device, means for causing the space current of the auxiliary device to vary inversely with the space current of the first device, means for producing a potential in proportion to the difference in the space currents of said devices, and means for causing the space current of the first device to vary inversely with said potential.

2. In combination, a space discharge device, an auxiliary space discharge device, an impedance element connected in the space current circuits of the two devices so that said space currents produce opposing potential drops therein, means responsive to the space current of the first device for controlling the space current of said auxiliary device, and means responsive to the net potential drop in said impedance element for controlling the space current of the first device.

3. In combination, a signal receiving system having an output current with a direct current component directly proportional to the amplitude of the signal output, means for producing an electromotive force directly proportional to said direct current component, a space discharge device having an anode, a cathode and a control element, a space current circuit for said device, connections for supplying said electromotive force between said cathode and control element to control said space current inversely with said electromotive force, means for producing a second electromotive force directly proportional to the difference between said direct current component and said space current, and means responsive to said second electromotive force for controlling the amplitude of the signal output of said receiver.

4. In combination, a space discharge device, an auxiliary space discharge device, an impedance element so connected in the space current circuits of the two devices that said space currents produce opposing potential drops therein, means for controlling the space current of said auxiliary device inversely with the space current of the first device, a second impedance element connected in the space current circuit of said first device to the exclusion of the space current circuit of said auxiliary device, and means responsive to the sum of the net potential drop in the first impedance element and the potential drop in the second impedance element for controlling the space current of said first device.

5. In a control system, a space discharge device, a second space discharge device having an anode, a cathode and a control element, a resistance element connected in the anode-cathode circuits of said devices so that the anode-cathode currents of said devices flow in opposite directions therethrough, a second resistance element connected in the anode-cathode circuit of the first device to the exclusion of the anode-cathode circuit of the second device, means for impressing between the cathode and control element of said second device a voltage directly proportional to the voltage drop in said second resistance, and means for controlling the anode-cathode current of the first device in inverse proportion to the sum of the net voltage drop in the first resistance element and the voltage drop in the second resistance element.

6. In combination, a space discharge device, an auxiliary space discharge device having an anode and cathode and a control element, a resistance element connected in the space current circuit of the first device, connections from said resistance element to the control electrode and cathode of the second device whereby the potential difference between said control electrode and cathode is made dependent on the space current of said first device to control the space current of said auxiliary device inversely with the space current of said first device, a second resistance element connected in the space current circuits of both of said devices so that said space currents flow in opposite directions therethrough, and means for controlling the space current of said first device in response to the voltage drop across said second resistance element.

7. The combination according to the next preceding claim in which the means includes a space discharge device having a cathode and a control element and connections for impressing the voltage drop across the second resistance between said cathode and control element to control the space current of said device inversely with said voltage drop.

In witness whereof, I hereunto subscribe my name, this 15th day of December, 1928.

EDMOND BRUCE.